US008523496B2

(12) United States Patent
Bartek

(10) Patent No.: US 8,523,496 B2
(45) Date of Patent: Sep. 3, 2013

(54) BIOMASS FEED SYSTEM/PROCESS

(75) Inventor: Robert Bartek, Centennial, CO (US)

(73) Assignee: KiOR, Inc., Pasadena, TX (US)

( * ) Notice: Subject to any disclaimer, the term of this patent is extended or adjusted under 35 U.S.C. 154(b) by 71 days.

(21) Appl. No.: 12/703,492

(22) Filed: Feb. 10, 2010

(65) Prior Publication Data

US 2011/0174597 A1 Jul. 21, 2011

(51) Int. Cl.
*B65G 53/00* (2006.01)
(52) U.S. Cl.
USPC ............... 406/197; 406/52; 406/56; 406/60; 406/75; 406/124; 406/127
(58) Field of Classification Search
USPC ............... 406/52, 56, 60, 75, 124, 127, 197
See application file for complete search history.

(56) References Cited

U.S. PATENT DOCUMENTS

| | | | | |
|---|---|---|---|---|
| 1,798,857 A * | 3/1931 | Tyler | ............................. | 423/171 |
| 2,376,139 A * | 5/1945 | Hemminger | ............ | 208/120.01 |
| 2,841,101 A * | 7/1958 | Hale et al. | ....................... | 406/10 |
| 4,017,254 A * | 4/1977 | Jones | ............................. | 432/72 |
| 4,071,151 A | 1/1978 | Farber | | |
| 4,401,402 A * | 8/1983 | Casperson | ................... | 414/218 |
| 4,473,459 A * | 9/1984 | Bose et al. | .................... | 208/391 |
| 4,881,862 A * | 11/1989 | Dick | ............................. | 414/218 |
| 5,388,537 A * | 2/1995 | Larson et al. | ................. | 110/346 |
| 5,478,172 A * | 12/1995 | Oura et al. | ...................... | 406/23 |
| 5,615,987 A * | 4/1997 | Weist | ............................. | 414/218 |
| 5,634,713 A * | 6/1997 | Abe | .............................. | 366/102 |
| 5,728,910 A * | 3/1998 | Matsubara et al. | ............ | 585/241 |
| 5,765,728 A * | 6/1998 | Simpson et al. | ............ | 222/146.2 |
| 6,079,461 A * | 6/2000 | Fisher et al. | ................... | 141/231 |
| 6,379,086 B1 * | 4/2002 | Goth | ............................. | 406/75 |
| 6,387,221 B1 * | 5/2002 | Schoenhard | ..................... | 201/25 |
| 6,392,114 B1 * | 5/2002 | Shields et al. | ............... | 585/719 |
| 6,486,374 B1 * | 11/2002 | Radcliffe et al. | ............. | 585/714 |
| 6,767,375 B1 | 7/2004 | Pearson | | |
| 7,080,960 B2 * | 7/2006 | Burnett | .......................... | 406/11 |
| 7,137,759 B1 * | 11/2006 | Ambs | ............................. | 406/55 |
| 7,228,990 B2 * | 6/2007 | Schmidt | .......................... | 222/77 |
| 7,314,538 B2 * | 1/2008 | Lashofer et al. | ................ | 162/52 |
| 7,320,561 B2 * | 1/2008 | Ambs et al. | .................... | 406/31 |
| 7,439,410 B1 * | 10/2008 | Rice et al. | ...................... | 585/332 |
| 7,658,776 B1 | 2/2010 | Pearson | | |
| 7,815,889 B2 * | 10/2010 | Luan et al. | ..................... | 423/638 |
| 7,832,344 B2 * | 11/2010 | Capote et al. | .................. | 110/250 |
| 7,866,060 B2 * | 1/2011 | Carin et al. | ..................... | 34/487 |

(Continued)

OTHER PUBLICATIONS

International Preliminary Report on Patentability, Written Opinion, and Search Report dated Aug. 14, 2012 for co-pending PCT Application No. PCT/US2011/023963, filed on Feb. 8, 2011; 8 Pages.

*Primary Examiner* — Joseph A Dillon, Jr.
(74) *Attorney, Agent, or Firm* — Hovey Williams LLP

(57) ABSTRACT

The invention relates generally to the conversion of biomass to oxygenated hydrocarbons. More particularly, an improved biomass feed system or process for conveying biomass to a reactor for conversion to oxygenated hydrocarbons is provided. The provided system or process utilizes a spool piece adapted to convey solid particulate biomass from a lower pressure to a higher pressure. The spool piece conveys the solid particulate biomass material either directly to a reactor operated at or below the higher pressure or first to a vibratory feeder and then to such reactor. The vibratory feeder can include a bowl and an outlet spout extending tangentially from the bowl.

15 Claims, 3 Drawing Sheets

(56) References Cited

U.S. PATENT DOCUMENTS

| | | |
|---|---|---|
| 7,891,930 B2 * | 2/2011 | Brown .......................... 414/507 |
| 7,955,843 B2 * | 6/2011 | Barringer, Jr. ............. 435/309.2 |
| 8,129,486 B2 * | 3/2012 | Force et al. ..................... 526/88 |
| 8,147,797 B2 * | 4/2012 | Donaldson .................... 423/659 |
| 8,349,285 B2 * | 1/2013 | MacIntosh et al. ........ 423/449.1 |
| 2005/0069998 A1 | 3/2005 | Ballesteros Perdices et al. |

* cited by examiner

BIOMASS FEED SYSTEM/PROCESS

BACKGROUND OF THE INVENTION

1. Field of the Invention

The invention relates generally to the conversion of biomass to oxygenated hydrocarbons. More particularly, the invention relates to an improved biomass feed system or process for conveying biomass to a reactor for conversion to oxygenated hydrocarbons.

2. Description of the Related Art

Pyrolysis, in particular flash pyrolysis, has been proposed as a process for converting solid biomass material to liquid products. Pyrolysis in general refers to a process in which a feedstock is heated in an oxygen-poor or oxygen-free atmosphere. If solid biomass is used as the feedstock of a pyrolysis process, the process produces gaseous, liquid, and solid products.

Charging solid biomass to a reactor in an even and continuous manner poses numerous technical challenges. One such challenge is the pulsing of the biomass due in part to feed compaction during conveyance. Another challenge concerns the continuous re-charging of the biomass feed hopper in a pressurized system.

Thus, it is desirable to develop improved methods/systems for charging solid biomass to a reactor in an even and continuous manner.

BRIEF SUMMARY OF THE INVENTION

In accordance with an embodiment of the present invention, a process is provided including the steps of:
 a) providing a spool piece having a pressure vent, an inlet valve and an outlet valve; wherein the outlet valve is connected in fluid flow communication with a reactor;
 b) closing the outlet valve;
 c) opening the inlet valve;
 d) charging a quantity of the solid particulate biomass material to the spool piece through the inlet valve at a pressure $P_1$;
 e) closing the inlet valve;
 f) pressurizing the spool piece to a pressure $P_2$, wherein $P_2$ is greater than $P_1$;
 g) opening the outlet valve and conveying the quantity of the solid particulate biomass material to the reactor operated at or below pressure $P_2$;
 h) closing the outlet valve;
 i) opening the pressure vent to reduce the pressure in the spool piece to $P_1$; and
 j) closing the pressure vent.

In accordance with an embodiment of the present invention, a process/system is provided including the steps of:
 a) providing a spool piece having a pressure vent, an inlet valve and an outlet valve;
 b) providing a vibratory feeder connected in fluid flow communication with the outlet valve;
 c) providing a reactor-mounted solids conveyer connected in fluid flow communication with the vibratory feeder and with a reactor;
 d) closing the outlet valve;
 e) opening the inlet valve;
 f) charging a quantity of the solid particulate biomass material to the spool piece through the inlet valve at a pressure $P_1$;
 g) closing the inlet valve;
 h) pressurizing the spool piece to a pressure $P_2$, wherein $P_2$ is greater than $P_1$;
 i) opening the outlet valve and conveying the quantity of the solid particulate biomass material to the vibratory feeder;
 j) conveying the quantity of the solid particulate biomass material to the reactor-mounted solids conveyer for charging to the reactor operated at a pressure at or below $P_2$;
 k) opening the pressure vent to reduce the pressure in the spool piece to $P_1$; and
 l) closing the pressure vent.

BRIEF DESCRIPTION OF THE DRAWINGS

The features and advantages of the invention will be appreciated upon reference to the following drawings, in which.

DESCRIPTION OF THE PREFERRED EMBODIMENTS

The biomass material useful in the current invention can be any biomass capable of being converted to liquid and gaseous hydrocarbons.

Preferred are solid biomass materials comprising cellulose, in particular lignocellulosic materials, because of the abundant availability of such materials, and their low cost. Examples of suitable solid biomass materials include forestry wastes, such as wood chips and saw dust; agricultural waste, such as straw, corn stover, sugar cane bagasse, municipal waste, in particular yard waste, paper, and' card board; energy crops such as switch grass, coppice, eucalyptus; and aquatic materials such as algae; and the like.

Figure 1:
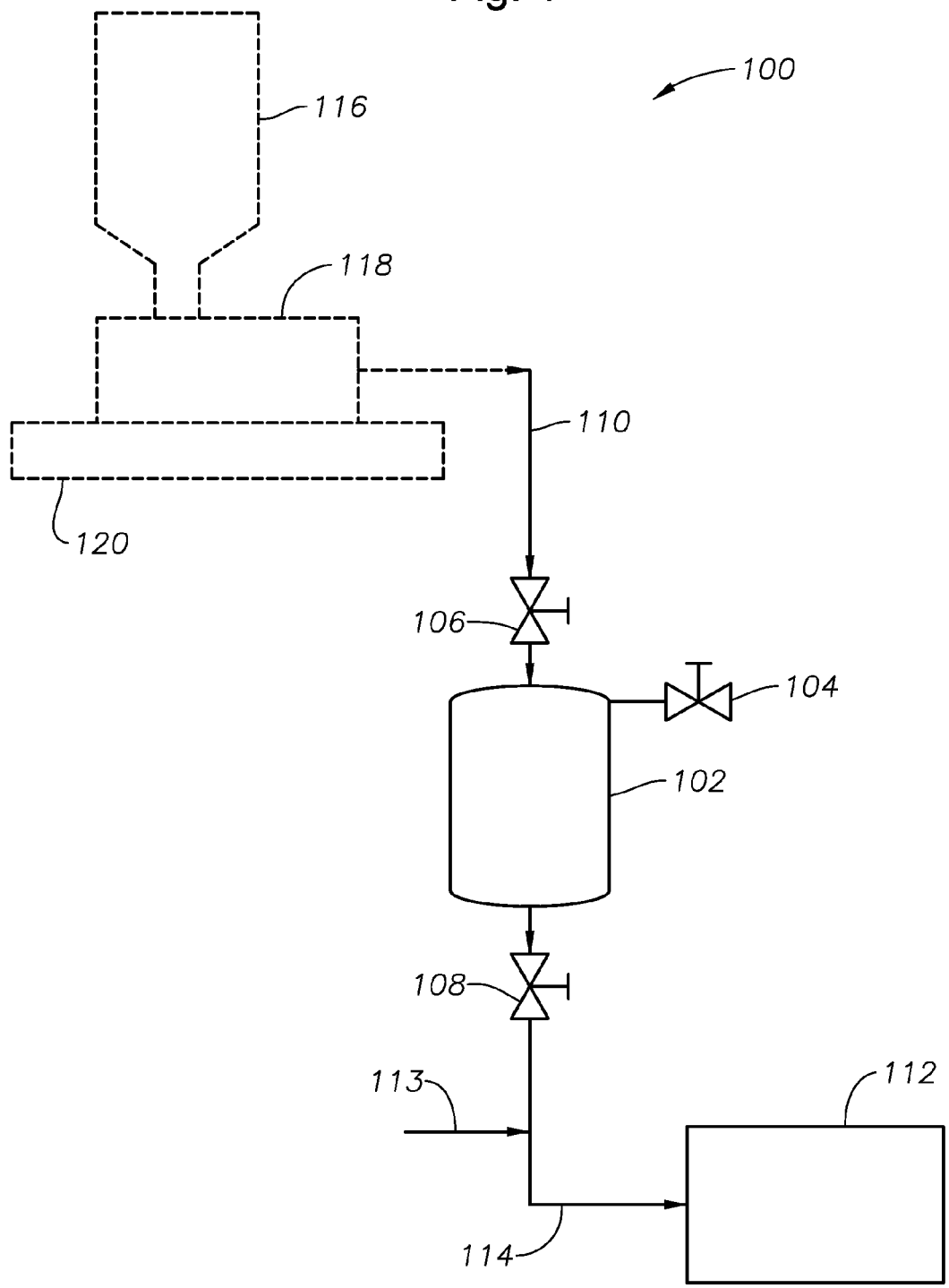
FIG. 1 is a flow diagram showing an embodiment of the present invention.

An embodiment of the invention will be described with reference to FIG. 1.

A process/system 100 is provided and comprises, consists of, or consists essentially of:
 a) providing a spool piece 102 having a pressure vent 104, an inlet valve 106, and an outlet valve 108 connected in fluid flow communication with a reactor 112 via a conduit 114;
 b) closing outlet valve 108;
 c) opening inlet valve 106;
 d) charging a quantity of solid particulate biomass material to spool piece 102 through conduit 110 and inlet valve 106 at a pressure $P_1$;
 e) closing inlet valve 106;
 f) pressurizing spool piece 102 to a pressure $P_2$, wherein $P_2$ is greater than $P_1$;
 g) opening outlet valve 108 and conveying the quantity of solid particulate biomass material to reactor 112 via conduit 114, wherein reactor 112 is operated at or below pressure $P_2$;
 h) closing outlet valve 108;
 i) opening pressure vent 104 to reduce the pressure in spool piece 102 to $P_1$; and
 j) closing pressure vent 104.

Steps c) through j) are preferably repeated at least once.

Pressure $P_1$ can be equal to or less than atmospheric pressure. Pressure $P_2$ can be greater than atmospheric pressure, and can be greater than 20 psia.

The process/system 100 can also include a hopper 116 connected in fluid flow communication with a solids conveyer 118 which is connected in fluid flow communication with inlet valve 106 via conduit 110. Solid particulate biomass material can be passed from hopper 116 to spool piece 102 by solids conveyer 118 and conduit 110. Solids conveyer 118 can be a screw feeder.

The process/system 100 can also include the measurement of the mass flow rate of the solid particulate biomass material to reactor 112. Hopper 116 and solids conveyer 118 can rest on a mass measuring device 120 selected from the group consisting of a scale or a load cell, and the mass flow rate can be measured by monitoring the weight of the solid particulate biomass material entering hopper 116 and leaving solids conveyer 118 using mass measuring device 120.

Conduit 114 can be a screw feeder for conveying the solid particulate biomass into reactor 112. A pressurized gas stream 113 can be charged to conduit 114 to provide a constant flow of gas to reactor 112. Reactor 112 can be a riser reactor, a fluid bed reactor, a moving bed reactor, or a cyclone reactor.

Figure 2:
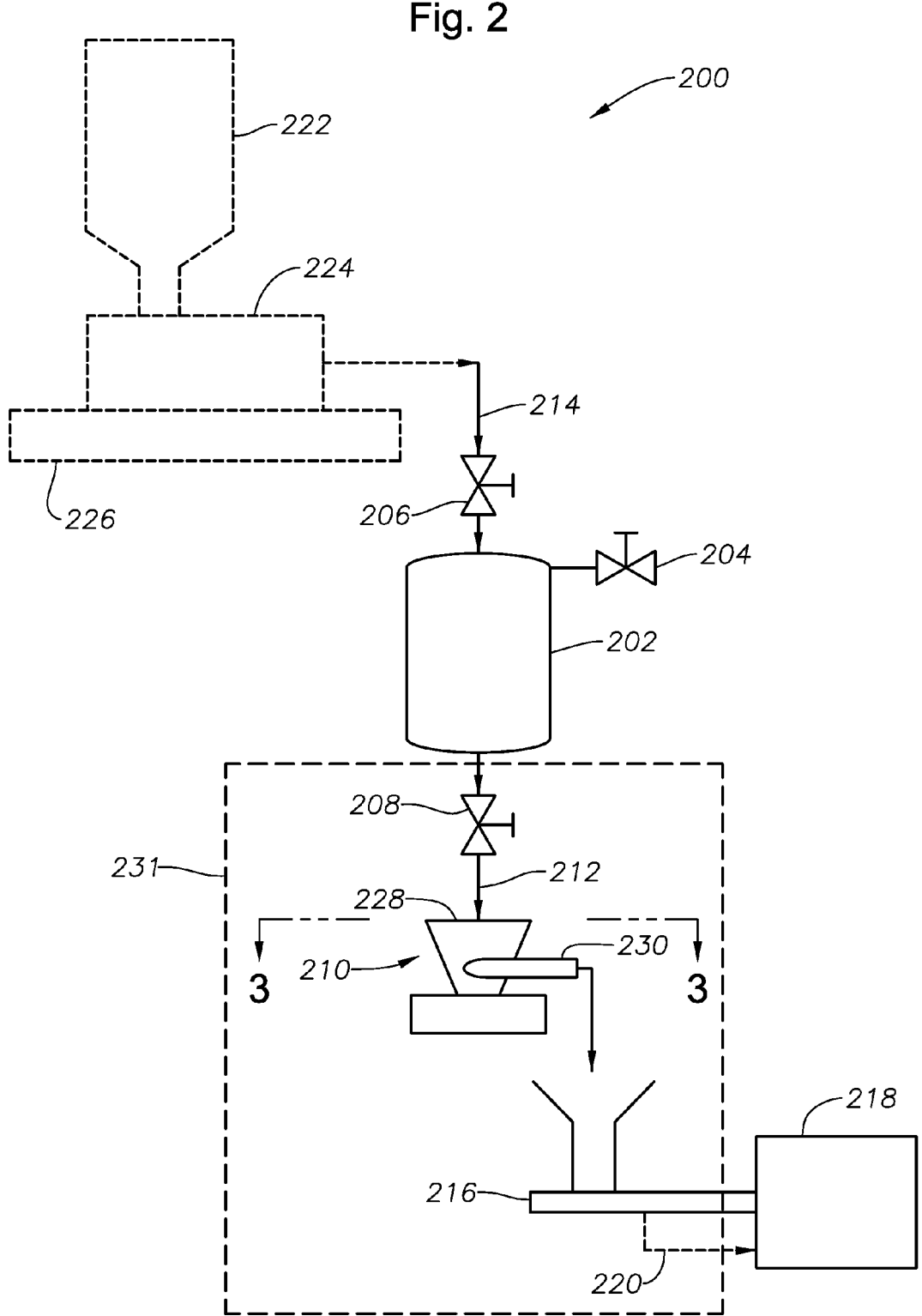
FIG. 2 is a flow diagram showing an embodiment of the present invention.

An embodiment of the invention will be described with reference to FIG. 2.

A process/system 200 is provided and comprises, consists of, or consists essentially of:
a) providing a spool piece 202 having a pressure vent 204, an inlet valve 206, and an outlet valve 208;
b) providing a vibratory feeder 210 connected in fluid flow communication with outlet valve 208 via a conduit 212;
c) providing a reactor-mounted solids conveyer 216 connected in fluid flow communication with vibratory feeder 210 and with a reactor 218 (optionally, reactor-mounted solids conveyer 216 is connected in fluid flow communication with reactor 218 via a conduit 220);
d) closing outlet valve 208;
e) opening inlet valve 206;
f) charging a quantity of solid particulate biomass material to spool piece 202 through conduit 214 and inlet valve 206 at a pressure $P_1$;
g) closing inlet valve 206;
h) pressurizing spool piece 202 to a pressure $P_2$, wherein $P_2$ is greater than $P_1$;
i) opening outlet valve 208 and conveying the quantity of solid particulate biomass material to vibratory feeder 210 via conduit 212;
j) closing outlet valve 208;
k) conveying the quantity of solid particulate biomass material to reactor-mounted solids conveyer 216 for charging to reactor 218 operated at a pressure at or below $P_2$;
l) opening pressure vent 204 to reduce the pressure in spool piece 202 to $P_1$; and
m) closing pressure vent 204.

Steps e) through m) are preferably repeated at least once.

Pressure $P_1$ can be equal to or less than atmospheric pressure. Pressure $P_2$ can be greater than atmospheric pressure, and can be greater than 20 psia.

The process/system 200 can also include a hopper 222 connected in fluid flow communication with a hopper-mounted solids conveyer 224 connected in fluid flow communication with inlet valve 206 via conduit 214. Solid particulate biomass material can be passed from hopper 222 to spool piece 202 by hopper-mounted solids conveyer 224 and conduit 214. Hopper-mounted solids conveyer 224 can be a screw feeder.

The process/system 200 can also include the measurement of the mass flow rate of the solid particulate biomass material to reactor 218. Hopper 222 and hopper-mounted solids conveyer 224 can rest on a mass measuring device 226 selected from the group consisting of a scale or a load cell, and the mass flow rate can be measured by monitoring the weight of the solid particulate biomass material entering hopper 222 and leaving solids conveyer 224 using mass measuring device 226.

The vibratory feeder can comprise a bowl 228 and an outlet spout 230 extending tangentially from said bowl 228, which are both subjected to vibration. In such embodiment, the outlet valve 208 is connected in fluid flow communication with bowl 228, and the outlet spout 230 is connected in fluid flow communication with reactor-mounted solids conveyer 216. The bowl 228 can be an open bowl. Also, the outlet valve 208, vibratory feeder 210, and reactor-mounted solids conveyer 216 can be sealed together in a pressure zone, represented in FIG. 2 by broken line 231.

Figure 3:
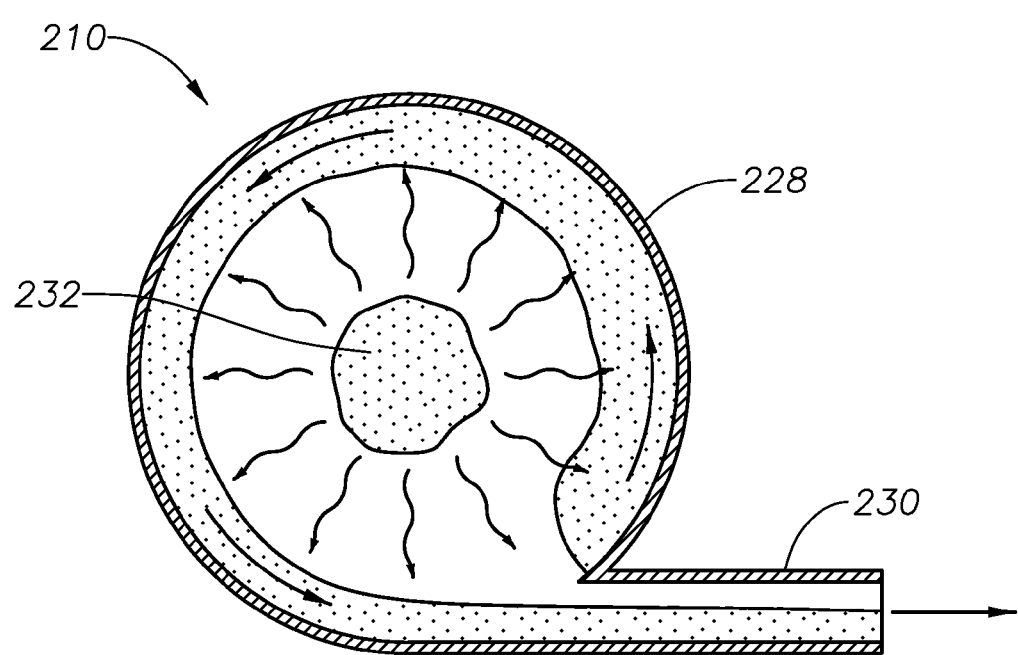
FIG. 3 is a section taken across line 3-3 of FIG. 2 showing in greater detail certain features and details of the feed system/process.

As shown in FIG. 3, the conveying of the quantity of solid particulate biomass material to vibratory feeder 210 in step i) can comprise charging the quantity of solid particulate biomass material 232 to bowl 228. The vibration of bowl 228 causes at least a portion of the quantity of solid particulate biomass material 232 to migrate to the edge of bowl 228 and to circumferentially travel about the edge of bowl 228, forming into a substantially uniform annular thickness of solid particulate biomass material prior to removal from bowl 228 through spout 230.

Reactor-mounted solids conveyer 216 can be a screw feeder for conveying the solid particulate biomass into reactor 218. A pressurized gas stream can be charged to reactor-mounted solids conveyer 216 to provide a constant flow of gas to reactor 218. Reactor 218 can be a riser reactor, a fluid bed reactor, a moving bed reactor, or a cyclone reactor.

Vibratory feeder 210 can oscillate at a frequency between 1 and 60 hertz.

The variation in mass flow rate of the solid particulate biomass material, at steady state conditions, can be within plus or minus about 10%, or within plus or minus about 5%, or within plus or minus about 2.5%.

A solid inorganic material, which can be a catalyst, can be mixed with the solid particulate biomass material prior to feeding to spool piece (102 or 202).

The catalyst can be selected from the group consisting of: a solid base, a clay, an inorganic oxide, an inorganic hydroxide, a zeolite, a supported metal, and combinations thereof. The solid base can be selected from the group consisting of: hydrotalcite; a hydrotalcite-like material; a clay; a layered hydroxy salt; a metal oxide; a metal hydroxide; a mixed metal oxide; or a mixture thereof.

The catalyst can also be an equilibrium catalyst ("E-cat") from a fluid catalytic cracking ("FCC") unit of an oil refinery. The term refers to catalyst material that has, on average, circulated in the FCC unit for a considerable length of time. The term is used to distinguish fresh catalyst, which has not been exposed to the environment of the FCC unit, and which has much greater catalytic activity than the E-cat. The term E-cat also refers to catalyst material that is removed from the FCC unit, to be replaced with fresh catalyst. This spent catalyst is a waste product from oil refineries, and as such abundantly available at low cost. It has been found that the reduced catalytic activity of E-cat is in fact of particular advantage in the pyrolysis process.

Preferably, the mean particle diameter of the solid particulate biomass material is less than about 500 μm, and more preferably less than about 125 μm.

The solid particulate biomass material can also be subjected to pretreatment prior to charging to the spool piece (102 or 202). The pretreatment can comprise a method selected from the group consisting of: a) drying; b) heat treatment in an oxygen-poor or oxygen-free atmosphere; c) solvent explosion; d) mechanical treatment with catalyst particles which can be carried out in a mixer, a mill, a grinder, or a kneader; e) demineralization; f) swelling in an aqueous solvent; g) impregnation of catalytic agents, mineral acids, organic acids, mineral bases; or h) a combination thereof.

Demineralization may be accomplished by swelling the solid particulate biomass material with an aqueous solvent, and subsequently removing at least part of the aqueous solvent by mechanical action. Examples of suitable mechanical action include kneading, and pressing, such as in a filter press.

Suitable examples of mechanical action include kneading, grinding, milling, and shredding. In a preferred embodiment the mechanical action is carried out in the presence of a particulate inorganic material, preferably a catalyst for the subsequent pyrolysis reaction.

The mechanical treatment described above can form an activated feed: a) coated with said catalyst particles, or b) having said catalyst particles embedded therein, or c) both a) and b).

The term "solvent explosion" refers to a process by which the solid particulate biomass material is contacted with a solvent in its liquid form, under pressure, at a temperature which is above the normal boiling point of the solvent. After the solvent is allowed to penetrate the solid particulate biomass material, the pressure is released precipitously, resulting in a rapid evaporation of the solvent. The resulting pressure build-up in the pores of the solid particulate biomass material can result in a rupturing of the structure of the solid particulate biomass material, making it more susceptible to the subsequent size reduction and pyrolysis reaction.

The heat treatment can be at a temperature in the range of from 90 to 300° C. In one preferred embodiment the heat treatment is at a temperature in the range of from 90 to 200° C., more preferably from 110 to 160° C. The heat treatment results in a modification of the structure of the solid particulate biomass material, making it significantly more susceptible to mechanical action.

Examples of suitable materials for impregnation into the biomass include sulfuric acid; ammonia; alkali metal and earth alkaline hydroxides; alkali metal and earth alkaline carbonates; hydrochloric acid; acetic acid; and the like. It should be noted that acetic acid, together with the other lower carboxylic acids (formic acid; propionic acid), although organic materials, are considered inorganic acids in this context.

While the technology has been particularly shown and described with reference to specific embodiments, it should be understood by those skilled in the art that various changes in form and detail may be made without departing from the spirit and scope of the technology as defined by the appended claims.

That which is claimed is:

1. A process for conveying solid particulate biomass material to a pyrolysis reactor, said process comprising the steps of:
    a) providing a spool piece having a pressure vent, an inlet valve and an outlet valve; wherein said outlet valve is connected in fluid flow communication with said pyrolysis reactor;
    b) closing said outlet valve;
    c) opening said inlet valve;
    d) charging a quantity of said solid particulate biomass material to said spool piece through said inlet valve at a pressure $P_1$;
    e) closing said inlet valve;
    f) pressurizing said spool piece to a pressure $P_2$, wherein $P_2$ is greater than $P_1$;
    g) opening said outlet valve and conveying said quantity of said solid particulate biomass material from said outlet valve to said pyrolysis reactor operated at or below pressure $P_2$;
    h) closing said outlet valve;
    i) opening said pressure vent to reduce the pressure in said spool piece to $P_1$, wherein said vent opens into a space separate from the conveyance path of said quantity of said solid particulate biomass material being conveyed to said pyrolysis reactor; and
    j) closing said pressure vent, wherein at least a portion of said conveying of step g) is by use of a screw feeder connected in fluid flow communication with said spool piece and with said reactor.

2. The process of claim 1 wherein steps c) through j) are repeated at least once.

3. The process of claim 1 wherein $P_1$ is equal to or less than atmospheric pressure.

4. The process of claim 1 wherein $P_2$ is greater than atmospheric pressure.

5. The process of claim 1 wherein $P_2$ is greater than 20 psia.

6. The process of claim 1 wherein said solid particulate biomass material is passed from a hopper to said spool piece by a solids conveyer which is connected in fluid flow communication with said hopper and with said inlet valve.

7. The process of claim 6 wherein said solids conveyer is a screw feeder.

8. The process of claim 6 further comprising measuring the mass flow rate of said solid particulate biomass material to said reactor.

9. The process of claim 8 wherein said hopper and said solids conveyer rest on a mass measuring device selected from the group consisting of a scale or a load cell, and said mass flow rate is measured by monitoring the weight of said solid particulate biomass material entering said hopper and leaving said solids conveyer using said mass measuring device.

10. The process of claim 1 wherein a pressurized gas stream is charged to said screw feeder to provide a constant flow of gas to said reactor.

11. A process for conveying solid particulate biomass material to a pyrolysis reactor, said process comprising the steps of:
    a) providing a spool piece, said spool piece having a pressure vent, an inlet valve, and an outlet valve, wherein said outlet valve is connected in fluid flow communication with said pyrolysis reactor;
    b) conveying a quantity of said solid particulate biomass material through said inlet valve and into said spool piece at a pressure $P_1$, wherein at least a portion of said conveying is carried out using a screw feeder;
    c) pressurizing said spool piece to a pressure $P_2$, wherein $p_2$ is greater than $P_1$;
    d) conveying said quantity of said solid particulate biomass material from said outlet valve to said pyrolysis reactor operated at or below pressure $P_2$; and
    e) opening said pressure vent to reduce the pressure in said spool piece to $P_1$,
    wherein at least a portion of said conveying of step d) is carried out using a screw feeder connected in fluid flow communication with said spool piece and with said pyrolysis reactor.

12. The process according to claim 11, wherein said conveying of step b) includes conveying a catalyst in addition to said quantity of said solid particulate biomass material.

13. The process according to claim 1, wherein said pyrolysis reactor is a catalytic pyrolysis reactor.

14. The process according to claim 1, wherein said conveying of step g) includes conveying a catalyst in addition to said quantity of said solid particulate biomass material.

15. The process according to claim 11, wherein said pyrolysis reactor is a catalytic pyrolysis reactor.

* * * * *